United States Patent
Hayashi et al.

(10) Patent No.: US 10,209,888 B2
(45) Date of Patent: Feb. 19, 2019

(54) COMPUTER AND OPTIMIZATION METHOD

(71) Applicant: Hitachi, Ltd., Tokyo (JP)

(72) Inventors: Masayuki Hayashi, Tokyo (JP); Masayuki Gomyo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/552,819

(22) PCT Filed: May 13, 2015

(86) PCT No.: PCT/JP2015/063752
§ 371 (c)(1),
(2) Date: Aug. 23, 2017

(87) PCT Pub. No.: WO2016/181521
PCT Pub. Date: Nov. 17, 2016

(65) Prior Publication Data
US 2018/0032255 A1  Feb. 1, 2018

(51) Int. Cl.
G06F 3/06 (2006.01)
G06F 13/14 (2006.01)
G06F 13/10 (2006.01)
G06F 13/16 (2006.01)
G06F 12/0831 (2016.01)

(52) U.S. Cl.
CPC ........ G06F 3/0604 (2013.01); G06F 12/0835 (2013.01); G06F 13/102 (2013.01); G06F 13/14 (2013.01); G06F 13/16 (2013.01)

(58) Field of Classification Search
None
See application file for complete search history.

(56) References Cited

U.S. PATENT DOCUMENTS

2008/0086600 A1* 4/2008 Qiao ................ G06F 12/0862
                                                            711/133
2014/0281350 A1* 9/2014 Lango ................ G06F 3/0665
                                                            711/203

FOREIGN PATENT DOCUMENTS

JP  2012146105 A  *  8/2012
JP  2012146105 A      8/2012
(Continued)

OTHER PUBLICATIONS

International Search Report of PCT/JP2015/063752 dated Jul. 21, 2015.

Primary Examiner — Edward J Dudek, Jr.
Assistant Examiner — Ralph A Verderamo, III
(74) Attorney, Agent, or Firm — Mattingly & Malur, PC

(57) ABSTRACT

A computer has processors each including computation cores; memories, and an IO device, and includes NUMA nodes. The computer holds pattern management information to manage patterns and comprises a control module to determine a pattern to be applied to the computer. The pattern management information includes policy information including a policy on placement of a transfer-use memory area in the NUMA nodes, a policy on the placement of driver management information in the NUMA nodes, and a policy on allocation of computation cores that execute data transfer in the NUMA nodes, for each of the plurality of patterns. The control module applies each of the patterns to the computer based on the pattern management information, to measure IO performance in each of the patterns, and determine a pattern being highest in IO performance as a pattern to be applied to the computer.

14 Claims, 9 Drawing Sheets

PATTERN MANAGEMENT TABLE

| PATTERN ID | POLICY | | |
|---|---|---|---|
| | DMA TRANSFER MEMORY AREA PLACEMENT POLICY | QUEUE ALLOCATION POLICY | DRIVER MANAGEMENT INFORMATION PLACEMENT POLICY |
| A | PLACE AREA IN NUMA NODE ADJACENT TO HBA | ALLOCATE QUEUE TO EACH CPU OF EACH NUMA NODE | PLACE AREA IN NUMA NODE ADJACENT TO HBA |
| B | PLACE AREA IN NUMA NODE ADJACENT TO HBA | ALLOCATE QUEUE TO EACH CPU OF NUMA NODE ADJACENT TO HBA | PLACE AREA IN NUMA NODE ADJACENT TO HBA |
| C | PLACE AREA IN EACH NUMA NODE | ALLOCATE QUEUE TO EACH CPU OF EACH NUMA NODE | PLACE AREA IN EACH NUMA NODE |
| D | PLACE AREA IN NUMA NODE ADJACENT TO HBA | ALLOCATE QUEUE TO EACH CPU OF EACH NUMA NODE | PLACE AREA IN EACH NUMA NODE |

(56) References Cited

FOREIGN PATENT DOCUMENTS

JP        2012185660 A   *   9/2012
JP        2013008089 A   *   1/2013

* cited by examiner

IO COUNT MANAGEMENT TABLE

| BLOCK SIZE [byte] | AVERAGE COUNT | LOG | | | |
|---|---|---|---|---|---|
| | | X month X day | X month Y day | X month Z day | ... |
| 512 | 1,000 | 1,500 | ... | ... | ... |
| 1024 | 1,000,000 | 1,100,000 | ... | ... | ... |
| 2048 | 1,000,000 | 999,000 | ... | ... | ... |
| 4096 | 1,000,000,000 [HIGHEST] | 1,230,000,000 | ... | ... | ... |
| 8192 | 10,000,000 | 8,950,000 | ... | ... | ... |
| 16384 | 1,000,000 | 1,099,000 | ... | ... | ... |
| 32768 | 1,000,000 | 900,000 | ... | ... | ... |

*FIG. 3*

PERFORMANCE MANAGEMENT TABLE

| BLOCK SIZE [byte] | PERFORMANCE [IOPS] | | | |
|---|---|---|---|---|
| | PATTERN A | PATTERN B | PATTERN C | PATTERN D |
| 512 | 500,000 [BEST] | 440,000 | 475,000 | 495,000 |
| 1024 | 450,000 | 435,000 | 460,000 | 465,000 [BEST] |
| 2048 | 400,000 | 430,000 | 445,000 [BEST] | 435,000 |
| 4096 | 350,000 | 425,000 | 430,000 [BEST] | 405,000 |
| 8192 | 300,000 | 420,000 [BEST] | 415,000 | 375,000 |
| 16384 | 250,000 | 415,000 [BEST] | 400,000 | 345,000 |
| 32768 | 200,000 | 410,000 [BEST] | 385,000 | 315,000 |

*FIG. 4*

PATTERN MANAGEMENT TABLE 136

| PATTERN ID 501 | POLICY 502 | | |
|---|---|---|---|
| | DMA TRANSFER MEMORY AREA PLACEMENT POLICY | QUEUE ALLOCATION POLICY | DRIVER MANAGEMENT INFORMATION PLACEMENT POLICY |
| A | PLACE AREA IN NUMA NODE ADJACENT TO HBA | ALLOCATE QUEUE TO EACH CPU OF EACH NUMA NODE | PLACE AREA IN NUMA NODE ADJACENT TO HBA |
| B | PLACE AREA IN NUMA NODE ADJACENT TO HBA | ALLOCATE QUEUE TO EACH CPU OF NUMA NODE ADJACENT TO HBA | PLACE AREA IN NUMA NODE ADJACENT TO HBA |
| C | PLACE AREA IN EACH NUMA NODE | ALLOCATE QUEUE TO EACH CPU OF EACH NUMA NODE | PLACE AREA IN EACH NUMA NODE |
| D | PLACE AREA IN NUMA NODE ADJACENT TO HBA | ALLOCATE QUEUE TO EACH CPU OF EACH NUMA NODE | PLACE AREA IN EACH NUMA NODE |

FIG. 5

COMPUTER AND OPTIMIZATION METHOD

BACKGROUND OF THE INVENTION

This invention relates to a system that adopts non-uniform memory access (NUMA) architecture.

The IO performance in a computer system that adopts NUMA improves in some cases by selecting a combination of a CPU and a memory to be used and a combination of an IO device and a memory to be used that can shorten access time.

For example, in JP 2012-146105 A, there is a description: "A computation unit, which includes CPUs 101 to 104 and memories 131 to 134, and an I/O unit, which includes PCIe switches 600a and 600b and I/O devices 410a-1 to 410b-4, are included. When the configuration of VMs is changed, a VMM running on the CPUs 101 to 104 selects a combination of a CPU, a memory, and an I/O device from the CPUs 101 to 104, the memories 131 to 134, and the I/O 410a-1 to 410b-4, and instructs a PCI manager 901, which runs on a management module 900, to change I/O. The PCI manager 901 couples and allocates the specified I/O out of the I/O 410a-1 to 410b-4."

SUMMARY OF THE INVENTION

In computer systems that employ NUMA in recent years, an interface is provided as a function of an OS, the interface allows a device driver to specify the association between a CPU and a memory and the association between an IO device and a memory based on the placement information about a CPU, a memory, and an IO device to be used.

The IO performance in a computer system that has a plurality of NUMA nodes is possibly lowered by the following three factors:

(Factor 1) CPU load
(Factor 2) Access between an IO device and a memory
(Factor 3) Access between a CPU and a memory Factor 2 and Factor 3 are considered in JP 2012-146105 A, but Factor 1 is not considered therein. As an example of Factor 1, a drop in IO performance as follows is conceivable. A drop in IO performance can be caused by Factor 1 when processing of an application program or other types of software on a computer system pushes up the capacity utilization of a CPU. In this case, even when the method of JP 2012-146105 A, in which Factor 2 and Factor 3 are considered, is used, IO performance is not always maximized.

In recent years, the capacity utilization of a CPU is high in a system that is demanded to have high IOPS performance, due to the frequent IO activation processing and IO response processing of a device driver itself. Accordingly, there is a strong possibility for a drop in IO performance that is caused by Factor 1.

The extent of a drop in IO performance that is caused by Factor 1 can be lessened by placing a CPU that is used by the device driver in a dispersed manner in order to avoid the drop in IO performance described above. This, however, lengthens the distance between the CPU and a memory and the distance between an IO device and a memory. In other words, the number of hops required to access a memory from the CPU, or required to access a memory from an IO device increases. There is accordingly a possibility for a drop in IO performance that is caused by Factor 2 or Factor 3.

For instance, when the block size of IO access is large, it is a large numbers of DMA transfers take place between an IO device and a memory, which translates into a strong possibility for a drop in IO performance that is caused by Factor 2.

A method for determining optimum placement of a CPU and a memory that are to be used so that IO performance is maximized while the three factors given above are taken into consideration is required.

The present invention can be appreciated by the description which follows in conjunction with the following figures, wherein: a computer comprises a plurality of processors each including a plurality of computation cores, a plurality of memories, and at least one IO device. The computer includes a plurality of nodes each made up of at least one of the plurality of processors and at least one of the plurality of memories that is accessed from the at least one of the plurality of processors in a shortest access time. The computer is configured to hold pattern management information, which is used to manage a plurality of patterns defining settings to be set to the plurality of nodes in order to carry out data transfer between the computer and an apparatus coupled to the computer via the at least one IO device. The computer comprises a control module configured to determine a pattern to be applied to the computer based on IO performance in each of the plurality of patterns. The pattern management information includes policy information for each of the plurality of patterns, the policy information including a policy on placement of a transfer-use memory area, which is used for the data transfer, in the plurality of nodes, a policy on placement of driver management information, which is used to operate the at least one IO device, in the plurality of nodes, and a policy on allocation of computation cores that execute processing of the data transfer in the plurality of nodes. The control module is configured to: apply each of the plurality of patterns to the computer based on the pattern management information, to thereby measure IO performance in each of the plurality of patterns; and determine, based on a result of analyzing the IO performance, one of the plurality of patterns that is highest in IO performance as a pattern to be applied to the computer.

According to this invention, a pattern that has the highest IO performance can be determined out of a plurality of patterns in which various factors for a drop in IO performance are considered.

BRIEF DESCRIPTION OF THE DRAWINGS

The present invention can be appreciated by the description which follows in conjunction with the following figures, wherein:

FIG. 3 is an explanatory diagram for showing an example of an IO count management table according to the first embodiment;

FIG. 4 is an explanatory diagram for showing an example of a performance management table according to the first embodiment;

FIG. 5 is an explanatory diagram for showing an example of a pattern management table according to the first embodiment;

DETAILED DESCRIPTION OF THE PREFERRED EMBODIMENTS

Embodiments of this invention are described below with reference to the drawings.

First Embodiment

Figure 1:
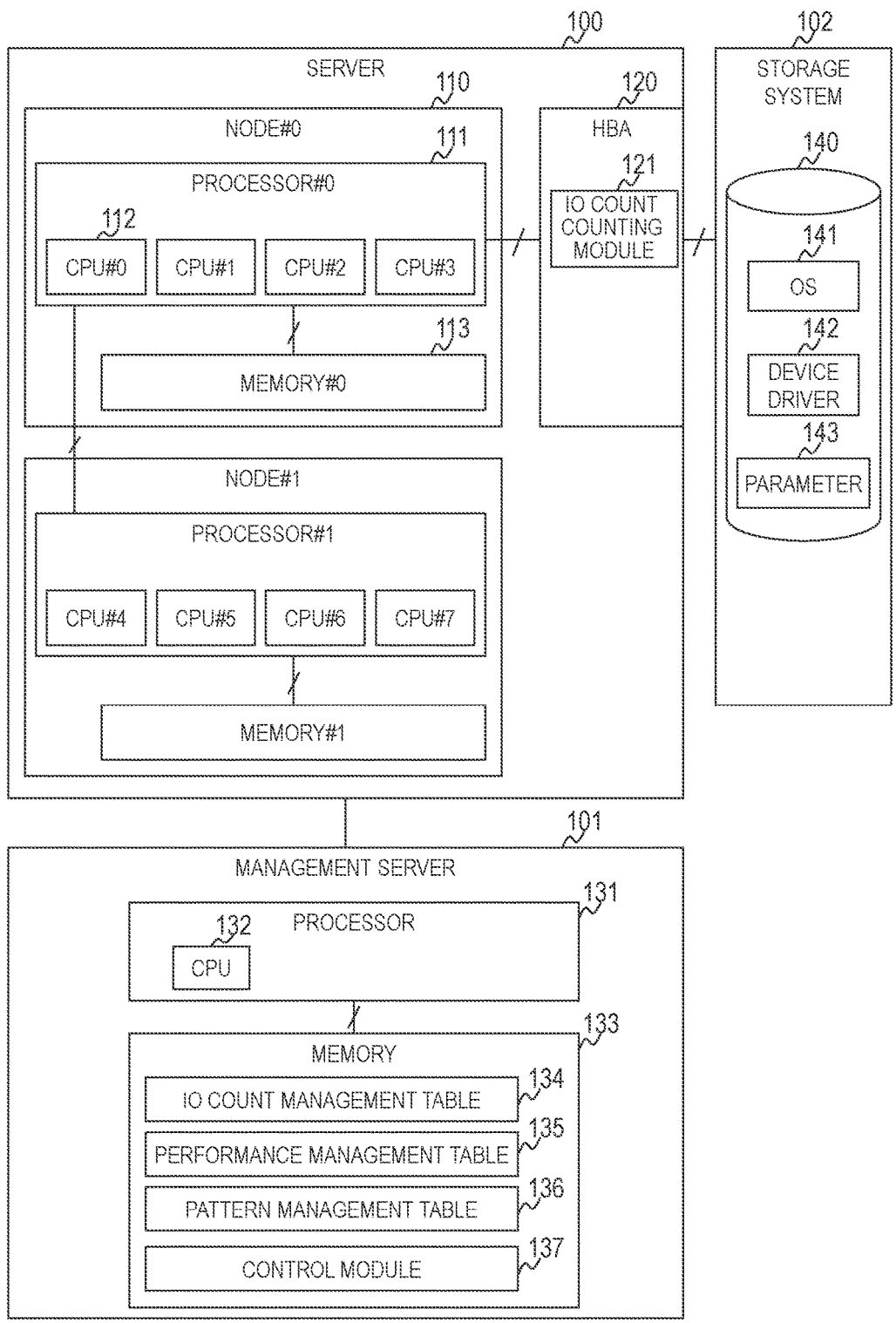
FIG. 1 is a block diagram for illustrating an example of the configuration of a computer system according to a first embodiment of this invention.

FIG. 1 is a block diagram for illustrating an example of the configuration of a computer system according to a first embodiment of this invention.

The computer system of the first embodiment includes a server 100, a management server 101, and a storage system 102.

The server 100 is a computer configured to execute given processing by accessing the storage system 102 or others. The server 100 includes a plurality of processors 111, a plurality of memories 113, and an HBA 120. The server 100 also includes a network interface or a similar interface (not shown) configured to couple to the management server 101. In the example of FIG. 1, the server 100 has two processors: a processor 0 (111) and a processor 1 (111), and two memories: a memory 0 (113) and a memory 1 (113).

Each processor 111 includes a plurality of CPUs 112. In the example of FIG. 1, the processor 0 (111) has a CPU 0 (112), a CPU 1 (112), a CPU 2 (112), and a CPU 3 (112), and the processor 1 (111) has a CPU 4 (112), a CPU 5 (112), a CPU 6 (112), and a CPU 7 (112). The CPUs 112 are configured to execute given processing by executing a program that is stored in the memories 113 or other places. When a description given below about processing has a program as the subject, it means that the program is executed by the CPUs 112.

Figure 2:
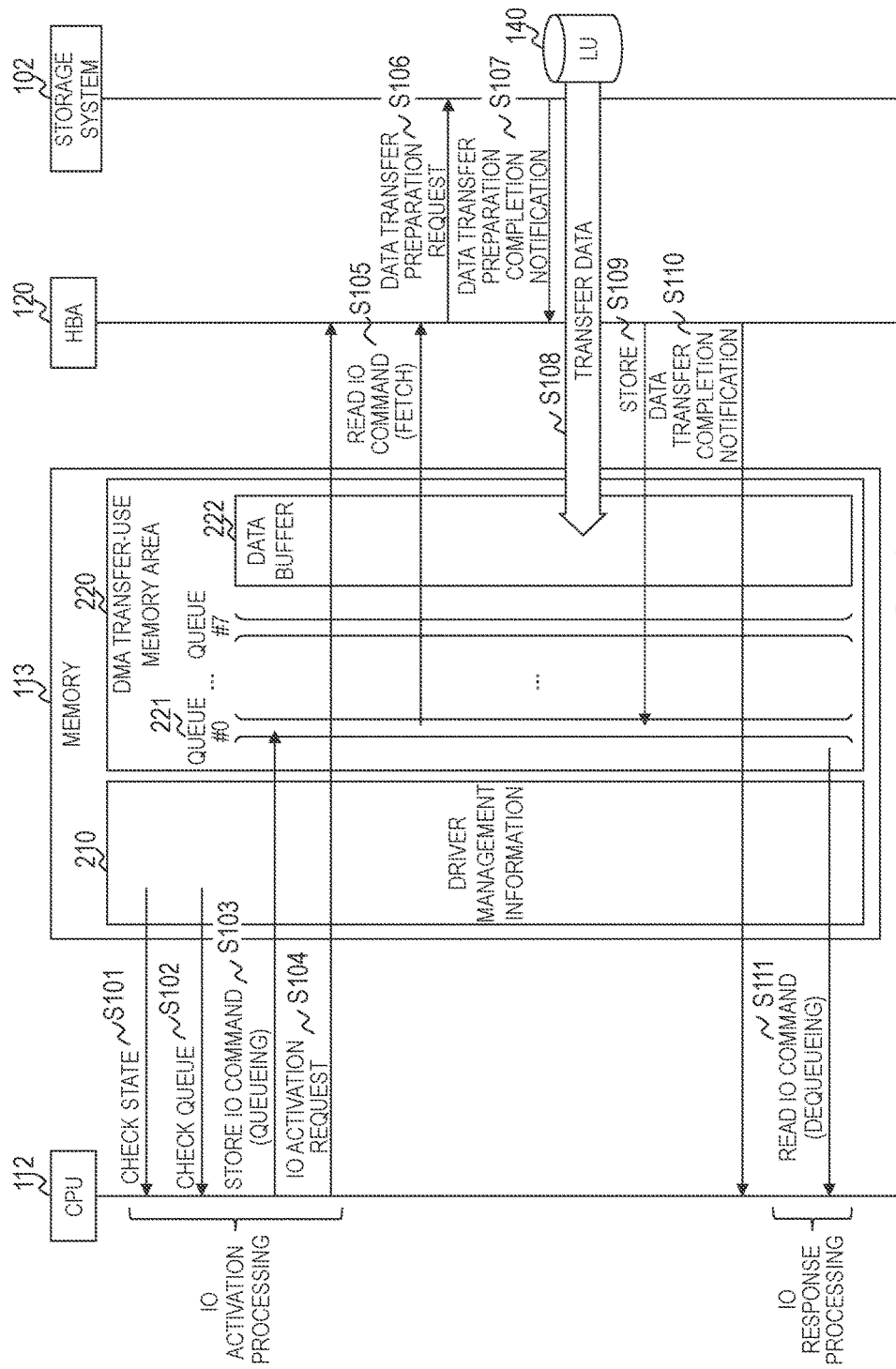
FIG. 2 is a sequence diagram for illustrating the flow of DMA transfer processing in the computer system according to the first embodiment.

The memories 113 are configured to store programs executed by the CPUs 112 and information necessary to execute the programs. Each memory 113 of the first embodiment stores an OS 141 and a device driver 142, which are described later. At least one of the memories 113 in the server 100 stores driver management information 210 illustrated in FIG. 2, which is described later, and a DMA transfer-use memory area 220 illustrated in FIG. 2 is included as a part of a memory area of at least one of the memories 113 in the server 100.

The HBA 120 is an interface configured to couple to the storage system 102. The HBA 120 in the first embodiment includes an IO count counting module 121. The IO count counting module 121 is configured to count the number of times IO access is executed between the server 100 and the storage system 102, with the block size as the unit of taking the count. The server 100 may include IO devices other than the HBA 120.

In the first embodiment, one processor 111 and one of the memories 113 that is accessed in the shortest time from this processor 111 (a local memory) make up a NUMA node 110. The number of the memories 113 that are included in one NUMA node 110 may be two or more. The processor 111 and the memory 113 that are included in one NUMA node 110 are coupled to each other directly or indirectly. One NUMA node 110 and another NUMA node 110 are coupled to each other in the server 100. In the following description, the NUMA nodes 110 may simply be referred to as "nodes 110" in places.

The server 100 may take the form of a housing including a plurality of blades and a switch module that includes a plurality of IO devices. In this case, one or more nodes 110 are located in a single blade. The blades are coupled to one another via a backplane, and the backplane also couples the blades and the switch module to each other.

The management server 101 is a computer configured to manage the server 100. The management server 101 includes a processor 131 and a memory 133. The management server 101 also includes a network interface or a similar interface (not shown) configured to couple to the server 100.

The processor 131 includes at least one CPU 132. The CPU 132 is the same as the CPUs 112, and a description on the CPU 132 is therefore omitted. When a description given below about processing has a program as the subject, it means that the program is executed by the CPU 132. The memory 133 is the same as the memories 113, and a description on the memory 133 is therefore omitted.

The memory 133 is configured to store an IO count management table 134, a performance management table 135, and a pattern management table 136. The memory 133 is also configured to store a program that implements a control module 137.

The control module 137 is configured to obtain information on the IO performance of the server 100, and to determine, based on the obtained information on the IO performance, the allocation of queues to the nodes 110, the placement of the driver management information 210 illustrated in FIG. 2 on the nodes 110, and the placement of the DMA transfer-use memory area 220 illustrated in FIG. 2 on the nodes 110.

The IO count management table 134 is information that is used to manage the number of times IO access is executed, with the block size as the unit of managing the IO access count. Details of the IO count management table 134 are described with reference to FIG. 3. The performance management table 135 is information that is used to manage the IO performance of the server 100 for each pattern. Details of the performance management table 135 are described with reference to FIG. 4. The pattern management table 136 is information that is used to manage policies for each pattern. Details of the pattern management table 136 are described with reference to FIG. 5.

The term "pattern" here means a policy that defines settings set to a plurality of nodes 110 in order to carry out DMA transfer, and includes, specifically, a policy on the allocation of queues to the nodes 110, a policy on the placement of the driver management information 210 illustrated in FIG. 2 on the nodes 110, and a policy on the placement of the DMA transfer-use memory area 220 illustrated in FIG. 2 on the nodes 110.

The storage system 102 is configured to store various types of data, and to provide a logical unit (LU) 140 to the server 100. The storage system 102 includes a controller, a disk interface, a network interface, and a plurality of storage media, which are not shown. The storage media can be hard disk drives (HDDs), solid state drives (SSDs), and the like.

The storage system 102 uses the plurality of storage media to build a redundant array of inexpensive disks (RAID), and generates at least one LU 140 from RAID volumes. A memory of the storage system 102 is configured to store a storage controlling OS and other programs, and information used by the programs.

The LU 140 is configured to store the OS 141, the device driver 142, and a parameter 143. The OS 141 is a program configured to execute the overall control of the server 100. The device driver 142 is a program configured to control the HBA 120 or other IO devices that are included in the server 100. The parameter 143 is a control parameter used to implement the server 100 to which a given pattern is applied.

When starting running, the server 100 reads the OS 141, the device driver 142, and the parameter 143 out of the LU 140, and loads the read OS, device driver, and parameter onto the memories 113. The server 100 uses the OS 141, device driver 142, and parameter 143 loaded onto the memories 113 to execute activation processing. The device driver 142 at this point allocates queues to the CPUs 112 of the processor 111 in at least one node 110 and places the driver management information 210 illustrated in FIG. 2 and the DMA transfer-use memory area 220 illustrated in FIG. 2 in the memory 113 of at least one node 110, based on the parameter 143.

When to apply a pattern is not limited to the timing described above. For instance, the OS 141 or the device driver 142 may change the placement of the driver management information 210 illustrated in FIG. 2 and the DMA transfer-use memory area 220 illustrated in FIG. 2 based on the parameter 143 while the server 100 is running. The same applies to queue allocation.

FIG. 2 is a sequence diagram for illustrating the flow of DMA transfer processing in the computer system according to the first embodiment.

The CPU 112 to which a queue is allocated uses the driver management information 210 and the DMA transfer-use memory area 220 that are placed in the memory 113 included in at least one of the nodes 110 to set settings necessary for DMA transfer processing. The DMA transfer processing is executed by the HBA 120 with the use of the DMA transfer-use memory area 220.

The driver management information 210 is information used by the device driver 142 to operate the HBA 120 or other IO devices. The driver management information 210 of the first embodiment includes information that is used to manage the state and the like of the IO device, and information on queues 221 allocated to the CPUs 112 that are included in the NUMA node 110 where the driver management information 210 is placed.

The DMA transfer-use memory area 220 is a memory area used for DMA transfer processing. The DMA transfer-use memory area 220 includes a plurality of queues 221 and a data buffer 222. The number of queues 221 is determined depending on the server 100 or the OS 141.

The device driver 142 executed by the CPU 112 first executes IO activation processing from Step S101 through Step S104.

The device driver 142 accesses the memory 113 that is included in at least one of the nodes 110 to refer to the driver management information 210 and determine whether or not IO activation is executable (Step S101). The device driver 142 refers to the driver management information 210 also to check the identification number of the queue 221 allocated to the CPU 112 that is executing the device driver 142 (Step S102).

The device driver 142 stores an IO command in one of the queues 221 in the DMA transfer-use memory area 220 that is associated with the identification number checked in Step S102 (Step S103). An IO command in the first embodiment includes the address of the data buffer 222 and a block size. The device driver 142 then outputs an IO activation request to the HBA 120 (Step S104).

The HBA 120 reads the IO command stored in the relevant queue 221 of the DMA transfer-use memory area 220 (Step S105). The HBA 120 outputs a data transfer preparation request to the storage system 102 (Step S106).

The storage system 102 receives the data transfer preparation request and, after preparations for transferring data are completed, outputs a data transfer preparation completion notification to the HBA 120 (Step S107). The storage system 102 then transfers the data from the given LU 140 to the DMA transfer-use memory area 220 in the server 100 (Step S108). In short, DMA transfer processing is executed. The storage system 102 transfers data in an amount that is equivalent to the block size specified by the IO command, to the data buffer 222 in the DMA transfer-use memory area 220.

After the DMA transfer processing is completed, the HBA 120 stores the IO command for which DMA transfer processing is finished in the relevant queue 221 of the DMA transfer-use memory area 220 (Step S109). The HBA 120 then notifies the completion of DMA transfer processing to the device driver 142 (Step S110).

The device driver 142 receives the notification informing of the completion of DMA transfer processing, and then executes IO response processing. Specifically, the device driver 142 reads the IO command out of the relevant queue 221 in the DMA transfer-use memory area 220 (Step S111).

In the first embodiment, operation from the start of the IO activation processing to the completion of the IO response processing is treated as one round of IO access. The number of times IO access is processed in one second is defined as IOPS. The IOPS is used in the first embodiment as an index that indicates IO performance. The management server 101 therefore holds the performance management table 135 as information that is used to manage IO performance.

FIG. 3 is an explanatory diagram for showing an example of the IO count management table 134 according to the first embodiment.

The IO count management table 134 is information that is used to manage the number of times IO access is executed between the server 100 and the storage system 102, with the block size as the unit of taking the count, and includes a block size 301, an average count 302, and a log 303. The management server 101 holds the IO count management table 134 in order to identify a data size that is used frequently in the server 100.

The block size 301 indicates a block size that is included in an IO command issued by the device driver 142. In other words, the IO count management table 134 is information used to manage the IO access count with a block size, which is the size of data transferred from the storage system 102, as the unit of taking the count.

The log 303 is log information indicating the IO access count that is counted in a freely-selected measurement period. In the first embodiment, the management server 101 obtains, as a log from the HBA 120, the number of times IO access is processed in a day, with the block size as the unit of taking the count, and sets the IO access count counted with the block size as the unit of taking the count in the log 303.

The average count 302 indicates an average value of IO access counts counted with the block size as the unit of taking the count in a given period. For example, the management server 101 refers to the log 303 to calculate an average value of the IO access counts that are counted in a week with the block size as the unit of taking the count.

FIG. 4 is an explanatory diagram for showing an example of the performance management table 135 according to the first embodiment.

The performance management table 135 is information on IO performance that is collected with the block size as the unit of collecting. The performance management table 135 includes a block size 401 and performance 402.

The block size 401 is the same as the block size 301. The performance 402 indicates, for each pattern, the IO performance in the pattern. In the first embodiment, a value stored as the performance 402 is the IOPS that is measured for each pattern with the block size as the unit of measuring. A value "best" stored in the performance 402 is information indicating that the pattern has the best performance in an arbitrary block size.

FIG. 5 is an explanatory diagram for showing an example of the pattern management table 136 according to the first embodiment. FIG. 6A, FIG. 6B, FIG. 6C, and FIG. 6D are explanatory diagrams for illustrating an example of the allocation of the queues 221, the placement of the driver management information 210, and the placement of the DMA transfer-use memory area 220 in the server 100 according to the first embodiment.

The pattern management table 136 holds policy information used to manage each of a plurality of patterns separately. Specifically, the pattern management table 136 includes a pattern ID 501 and policy 502.

The pattern ID 501 is an identifier with which a pattern is identified uniquely. In the following description, a pattern whose pattern ID 510 is "A" is referred to as "pattern A", a pattern whose pattern ID 510 is "B" is referred to as "pattern B", a pattern whose pattern ID 510 is "C" is referred to as "pattern C", and a pattern whose pattern ID 510 is "D" is referred to as "pattern D".

The policy 502 indicate policy information for each pattern, and include a policy on the placement of the DMA transfer-use memory area 220, a policy on the allocation of the queues 221 to the CPUs 112, and a policy on the placement of the driver management information 210.

The control module 137 of the management server 101 determines the allocation of the queues 221, the placement of the driver management information 210, and the placement of the DMA transfer-use memory area 220 in the server 100 based on the pattern management table 136.

A specific example of the allocation of the queues 221, the placement of the driver management information 210, and the placement of the DMA transfer-use memory area 220 is described for each pattern shown in FIG. 5 with reference to FIG. 6A, FIG. 6B, FIG. 6C, and FIG. 6D. In this example, eight queues 221 having identifiers "0" to "7" are allocated.

Figure 6A:
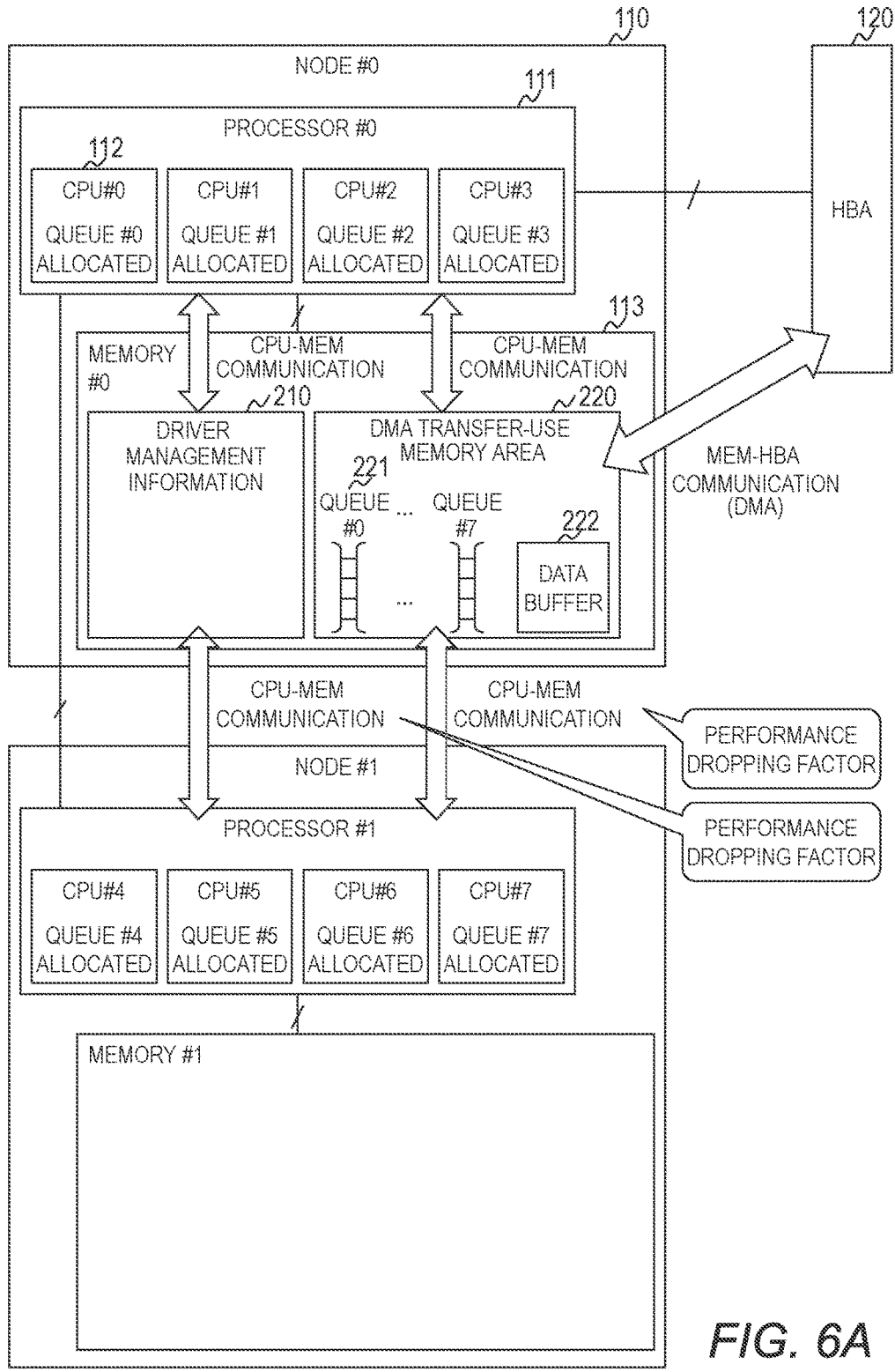
FIG. 6A, FIG. 6B, FIG. 6C, and FIG. 6D are explanatory diagrams for illustrating an example of allocation of the queues, placement of driver management information, and placement of a DMA transfer-use memory area in a server according to the first embodiment.

The state of the server 100 to which the pattern A is applied is illustrated in FIG. 6A.

The policy on the placement of the DMA transfer-use memory area 220 in the pattern A is "placing the area in a NUMA node that is adjacent to the HBA". "Being adjacent to the HBA" means passing through the smallest number of the nodes 110 (hop count) to couple to the HBA. In the case of the server 100 illustrated in FIG. 6A, the DMA transfer-use memory area 220 is placed in the memory 0 (113) of the node 0 (110), which has a hop count of "0".

The policy on the allocation of the queues 221 in the pattern A is "allocating a queue to each CPU of each NUMA node". Accordingly, one queue 221 is allocated to each of the CPU 0 (112) to the CPU 3 (112) in the node 0 (110), and one queue 221 is allocated to each of the CPU 4 (112) to the CPU 7 (112) in the node 1 (110).

The policy of the pattern A on the placement of the driver management information 210 is "placing the area in a NUMA node adjacent to the HBA". The driver management information 210 is accordingly placed in the memory 0 (113) of the node 0 (110), which has a hop count of "0", in the case of the server 100 illustrated in FIG. 6. This driver management information 210 includes information on the queues 221 that are allocated to the CPUs 112 included in the node 0 (110).

In the case of the pattern A, the queues 221 are allocated in each node 110 so as to be dispersed among the CPUs 112 of the node 110. The CPUs 112 of the node 0 (110) access the memory 0 (113) in a case of executing IO activation processing and IO response processing. The HBA 120 accesses the memory 0 (113) of the node 0 (110) in order to execute DMA transfer processing. The CPUs 112 of the node 1 (110) access the memory 0 (113) of the other node 0 (110) in a case of executing IO activation processing and IO response processing.

Each CPU 112 processes one queue 221 separately in the case of the pattern A. The pattern A is accordingly smaller than the pattern B in the extent of a drop in IO performance that is caused by Factor 1. The pattern A is also smaller than the pattern C in the extent of a drop in IO performance that is caused by Factor 2 because the HBA 120 accesses the node 110 that is coupled directly to the HBA 120 in DMA transfer processing.

On the other hand, communication between the CPUs 112 and the memory 113 in the case of the pattern A includes communication between the CPU 112 of the node 1 (110) and the memory 0 (113) of the node 0 (110). This makes the pattern A larger than the patterns B, C, and D in the extent of a drop in IO performance that is caused by Factor 3.

Figure 6B:
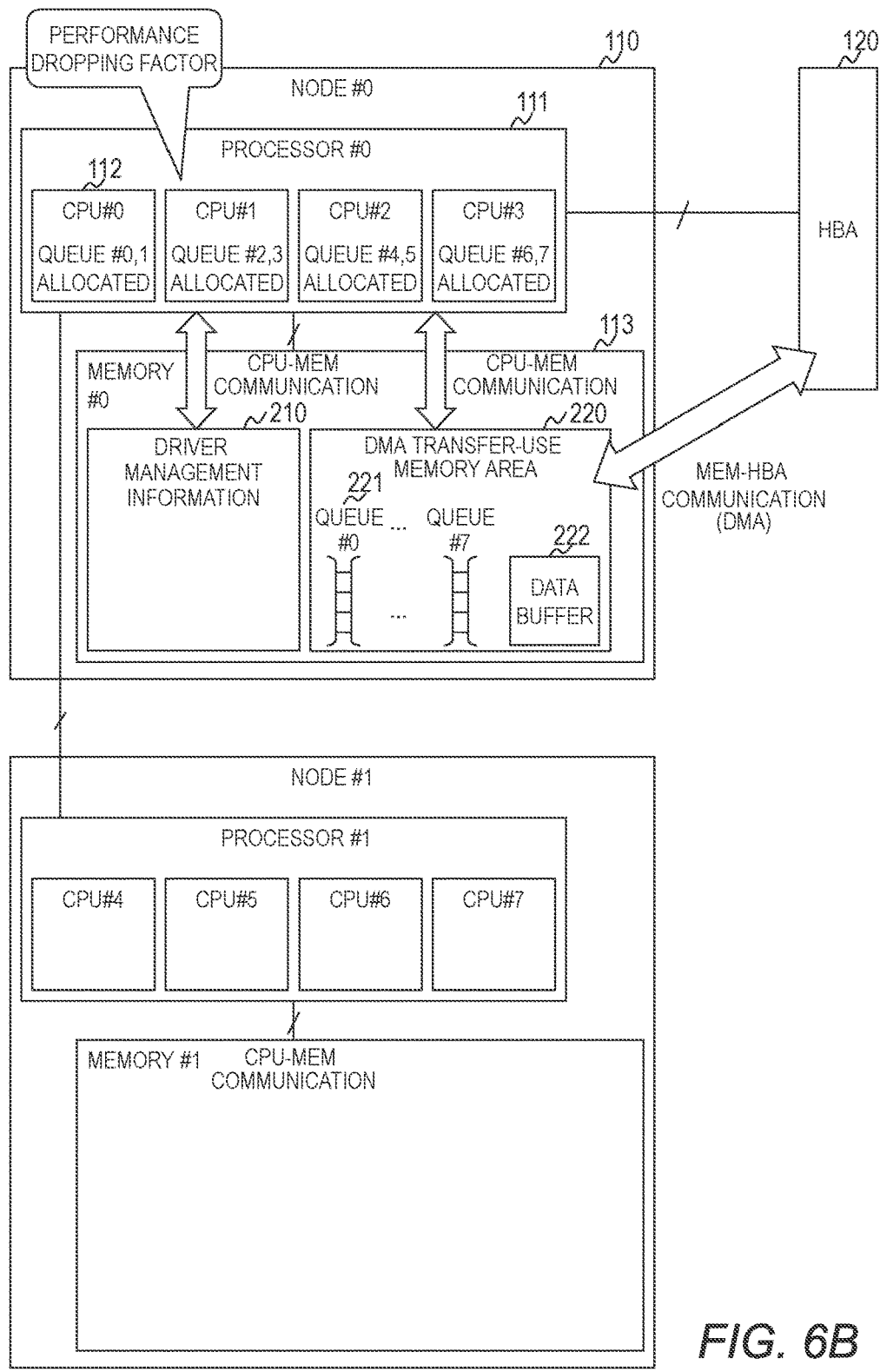

The state of the server 100 to which the pattern B is applied is illustrated in FIG. 6B.

The policy on the placement of the DMA transfer-use memory area 220 in the pattern B is "placing the area in a NUMA node that is adjacent to the HBA". The DMA transfer-use memory area 220 is accordingly placed in the memory 0 (113) of the node 0 (110).

The policy on the allocation of the queues 221 in the pattern B is "allocating a queue to each CPU of a NUMA node adjacent to the HBA". Accordingly, two queues 221 are allocated to each of the CPU 0 (112) to the CPU 3 (112) in the node 0 (110).

The policy on the placement of the driver management information 210 in the pattern B is "placing the area in a NUMA node adjacent to the HBA". The driver management information 210 is accordingly placed in the memory 0 (113) of the node 0 (110). This driver management information 210 includes information on the queues 221 that are allocated to the CPUs 112 included in the node 0 (110).

In the case of the pattern B, all of the queues 221 are allocated in one node 0 (110) so as to be dispersed among the CPUs 112 of the node 0 (110). The CPUs 112 of the node 0 (110) access the memory 0 (113) in a case of executing IO activation processing and IO response processing. The HBA 120 accesses the memory 0 (113) of the node 0 (110) in order to execute DMA transfer processing.

Each CPU 112 in one node 0 (110) processes two queues 221 in the case of the pattern B. The pattern B is accordingly larger than the pattern A, C, and D in the extent of a drop in IO performance that is caused by Factor 1.

On the other hand, the pattern B is equal to the pattern A and smaller than pattern C in the extent of a drop in IO performance that is caused by Factor 2. The pattern B is also smaller than the patterns A and D in the extent of a drop in IO performance that is caused by Factor 3 because communication between the CPUs 112 and the memory 113 is communication within the same node 0 (110).

Figure 6C:
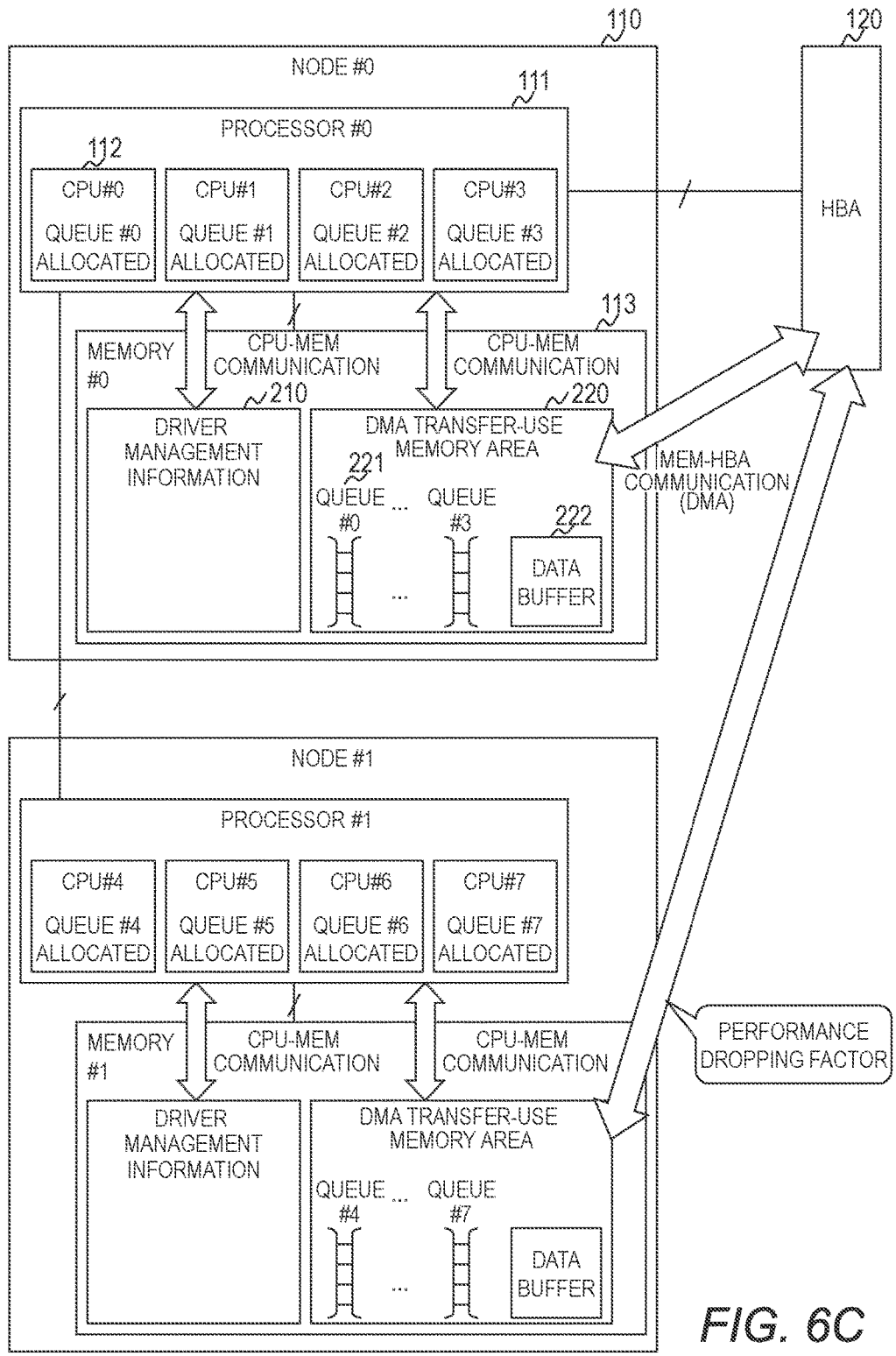

The state of the server 100 to which the pattern C is applied is illustrated in FIG. 6C.

The policy on the placement of the DMA transfer-use memory area 220 in the pattern C is "placing the area in each NUMA node". Accordingly, the DMA transfer-use memory area 220 is placed in each of the memory 0 (113) of the node 0 (110) and the memory 1 (113) of the node 1 (110). The queue 0 (221) to the queue 3 (221), which are allocated to the CPUs 112 that are included in the node 0 (110), are set in the DMA transfer-use memory area 220 that is placed in the node 0 (110). The queue 4 (221) to the queue 7 (221), which are allocated to the CPUs 112 that are included in the node 1 (110), are set in the DMA transfer-use memory area 220 that is placed in the node 1 (110).

The policy on the allocation of the queues 221 in the pattern C is "allocating a queue to each CPU of each NUMA node". One queue 221 is accordingly allocated to each CPU 112 of the node 0 (110) in which the DMA transfer-use memory area 220 is placed, and each CPU 112 of the node 1 (110) in which the DMA transfer-use memory area 220 is placed.

The policy on the placement of the driver management information 210 in the pattern C is "placing the area in each NUMA node". Accordingly, the driver management information 210 that includes information on the queues 221 that are allocated to the CPUs 112 of the node 0 (110) is placed in the memory 0 (113) of the node 0 (110), and the driver management information 210 that includes information on the queues 221 that are allocated to the CPUs 112 of the node 1 (110) is placed in the memory 1 (113) of the node 1 (110).

In the case of the pattern C, as in the case of the pattern A, the queues 221 are allocated in each node 110 so as to be dispersed among the CPUs 112 of the node 110. The CPUs 112 of the node 0 (110) access the memory 0 (113) in a case of executing IO activation processing and IO response processing. The CPUs 112 of the node 1 (110) access the memory 1 (113) in a case of executing IO activation processing and IO response processing. The HBA 120 accesses the memory 0 (113) of the node 0 (110) and the memory 1 (113) of the node 1 (110) in order to execute DMA transfer processing.

Each CPU 112 processes one queue 221 separately in the case of the pattern C. The pattern C is accordingly smaller than the pattern B in the extent of a drop in IO performance that is caused by Factor 1. The pattern C is also smaller than the patterns A and D in the extent of a drop in IO performance that is caused by Factor 3 because communication between the CPUs 112 and the memories 113 is communication within the same node 0 (110) or within the same node 1 (110).

On the other hand, communication between the HBA 120 and the memories 113 in the case of the pattern C includes communication between the memory 1 (113) of the node 1 (110). This makes the pattern C larger than the patterns A, B, and D in the extent of a drop in IO performance that is caused by Factor 2.

Figure 6D:
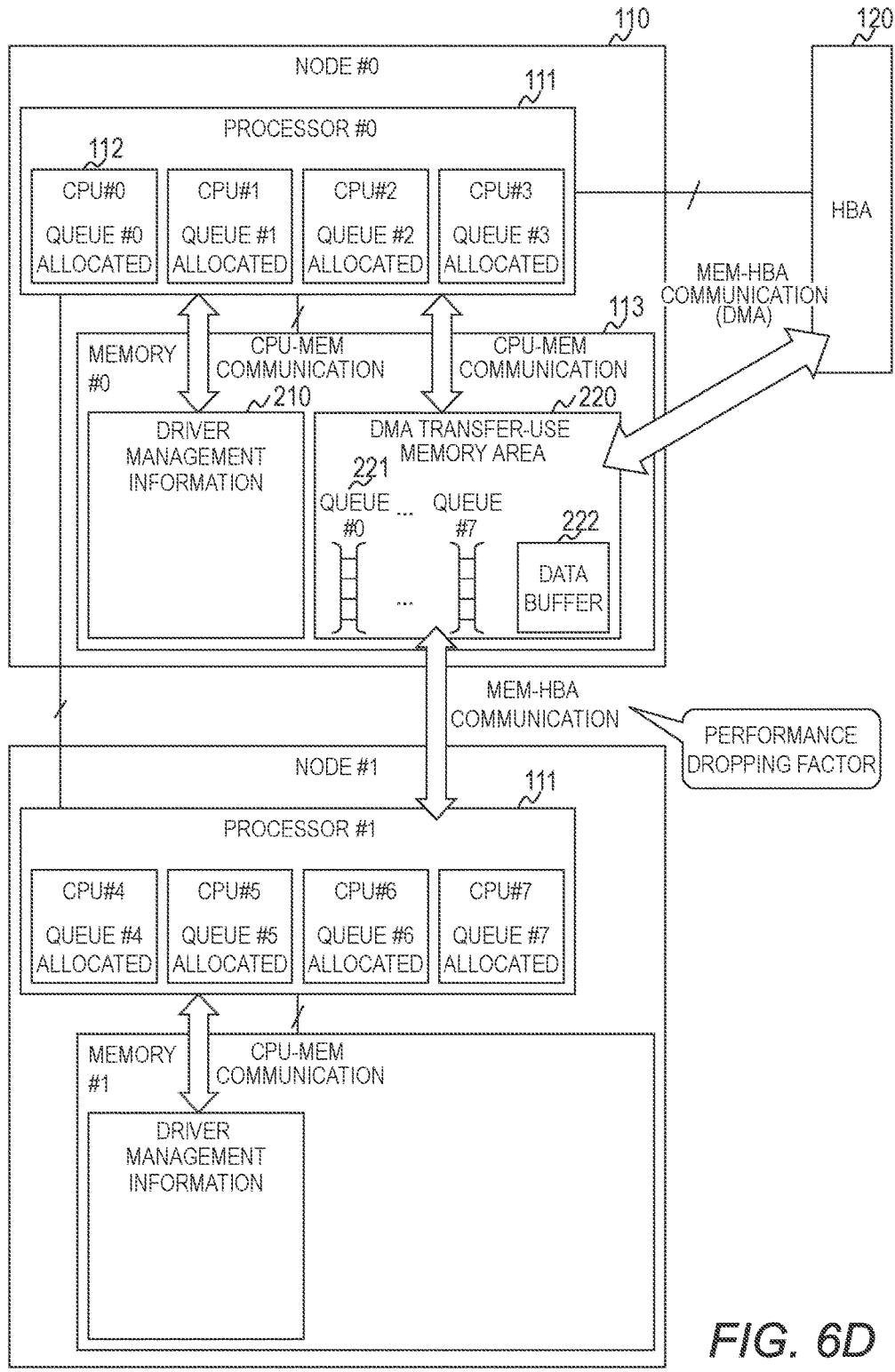

The state of the server 100 to which the pattern D is applied is illustrated in FIG. 6D.

The policy on the placement of the DMA transfer-use memory area 220 in the pattern D is "placing the area in a NUMA node that is adjacent to the HBA". The DMA transfer-use memory area 220 is accordingly placed in the memory 0 (113) of the node 0 (110).

The policy on the allocation of the queues 221 in the pattern D is "allocating a queue to each CPU of each NUMA node". One queue 221 is accordingly allocated to each CPU 112 of the node 0 (110), and each CPU 112 of the node 1 (110).

The policy on the placement of the driver management information 210 in the pattern D is "placing the area in each NUMA node". Accordingly, the driver management information 210 that includes information on the queues 221 that are allocated to the CPUs 112 of the node 0 (110) is placed in the memory 0 (113) of the node 0 (110), and the driver management information 210 that includes information on the queues 221 that are allocated to the CPUs 112 of the node 1 (110) is placed in the memory 1 (113) of the node 1 (110).

In the case of the pattern D, as in the case of the pattern A, the queues 221 are allocated in each node 110 so as to be dispersed among the CPUs 112 of the node 110. The CPUs 112 of the node 0 (110) access the memory 0 (113) in a case of executing IO activation processing and IO response processing. The HBA 120 accesses the memory 0 (113) of the node 0 (110) in order to execute DMA transfer processing. The CPUs 112 of the node 1 (110) access the memory 113 of the other node 0 (110) in a case of executing IO activation processing and IO response processing, in order to refer to the DMA transfer-use memory area 220.

Each CPU 112 processes one queue 221 separately in the case of the pattern D. The pattern D is accordingly smaller than the pattern B in the extent of a drop in IO performance that is caused by Factor 1. The pattern D is also smaller than the pattern C in the extent of a drop in IO performance that is caused by Factor 2, because the HBA 120 can access the node 110 that is coupled directly to the HBA 120.

On the other hand, communication between the CPUs 112 and the memory 113 in the case of the pattern D includes communication between the CPU 112 of the node 1 (110) and the memory 0 (113) of the node 0 (110). This makes the pattern D larger than the patterns B and C in the extent of a drop in IO performance that is caused by Factor 3. However, the CPUs 112 of the node 1 (110) only access the memory 0 (113) of the node 0 (110) in a case of accessing the DMA transfer-use memory area 220, and access the memory 1 (113), which is located in the same node 1 (110), in a case of accessing the driver management information 210. The pattern D is accordingly smaller than the pattern A in the extent of a drop in IO performance that is caused by Factor 3.

As described above, each of the four patterns has a point superior to other patterns and a point inferior to other patterns. This makes it difficult for an operator or other users who run the system to determine an optimum pattern. A method of automatically determining a pattern that is suitably applied to a system to be run is therefore needed.

The first embodiment provides a method in which the management server 101 automatically selects an optimum pattern based on IO performance that is measured for each pattern with the block size as the unit of measuring. The processing executed by the management server 101 is described with reference to a flow chart.

Figure 7:
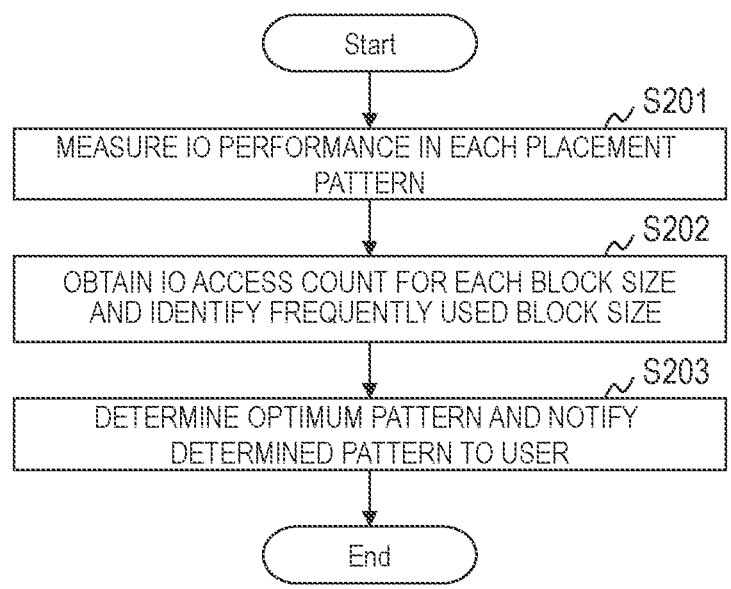
FIG. 7 is a flow chart for illustrating an example of pattern determining processing, which is executed by a management server according to the first embodiment.

FIG. 7 is a flow chart for illustrating an example of pattern determining processing, which is executed by the management server 101 according to the first embodiment. The processing described below is executed by the control module 137 of the management server 101.

The management server 101 executes the pattern determining processing described below before the running of the server 100 is started. The management server 101 first obtains the IO performance of the server 100 for each pattern (Step S201). Specifically, the following processing is executed.

The management server 101 first generates the performance management table 135 that is blank. The management server 101 generates in the performance management table 135 as many rows as the number of block sizes set in advance. The management server 101 generates as many columns as the number of patterns in the performance 402, and sets the identifier of a pattern to each column.

The management server 101 selects a pattern to be applied to the server 100, and generates a parameter 143 for applying the selected pattern to the server 100, based on the policy 502 in a row of the pattern management table 136 that is associated with the pattern. The generated parameter 143 is stored in the LU 140. The management server 101 obtains the IO performance of the server 100 to which the selected pattern is applied. Existing benchmark software can be used to obtain the IO performance. The management server 101 in this example uses benchmark software to obtain IOPS with the block size as the unit of measuring, and sets the obtained IOPS to a column of the performance 402 that is associated with the selected pattern. After finishing measuring the IO performance, the management server 101 deletes the parameter 143 from the LU 140. The management server 101 executes the processing described above for every pattern.

The parameter 143 may be prepared for each pattern in advance. The management server 101 in this case stores the parameter 143 that is associated with a selected pattern in the LU 140.

The management server 101 identifies a pattern that maximizes the IOPS for each block size, and sets the value "best" to the column of the identified pattern. The performance management table 135 as the one shown in FIG. 4 is generated in this manner. This concludes the description of the processing executed in Step S201.

The management server 101 next obtains the number of times IO access is executed in the server 100, with the block size as the unit of taking the count, to identify a block size that is used most (Step S202). Specifically, the following processing is executed.

The management server 101 selects any one of the patterns, and conducts an operational test with the use of the server 100 to which the pattern is applied.

The operational test may be conducted with the use of a test server 100 instead of the server 100 that is actually run. The IO access count is an index dependent on the OS 141, application software, and the like, not an index dependent on what pattern is used. Any pattern can therefore be applied to the server 100.

The IO count counting module 121 of the HBA 120 counts the number of times IO access is executed during the operational test, with the block size as the unit of taking the count. The management server 101 periodically obtains the IO access count that is counted by the IO count counting module 121 with the block size as the unit of taking the count. The management server 101 stores the obtained result of the counting in the log 303 of the IO count management table 134.

After the operational test is finished, the management server 101 refers to the log 303 to calculate an average value of IO access counts counted with the block size as the unit of taking the count. The management server 101 sets the calculated average value to the average count 302 in a row for the relevant block size. The management server 101 further identifies a block size that has the highest value as the average count 302. In the following description, the identified block size is also referred to as "frequently used block size".

The management server 101 may calculate an average IO access count and store the calculated value as the average count 302 when the log 303 is updated.

The management server 101 executes the processing described above for every pattern. This concludes the description of processing executed in Step S202.

The management server 101 next determines a pattern to be applied to the server 100, based on the IO performance in each pattern and on the frequently used block size, and notifies the determined pattern to the user (Step S203).

Specifically, the management server 101 searches the performance management table 135 for a row in which the block size 401 matches the frequently used block size, and determines, as a pattern to be applied to the server 100, a pattern that has the largest IOPS in the found row. The management server 101 generates notification information that notifies information about the determined pattern. The management server 101 presents the notification information to the user via an input/output apparatus, or presents the information about the determined pattern to the user by transmitting the notification information to a terminal that is operated by the user.

The information on the determined pattern includes at least identification information of the pattern. The information may also include a frequently used block size, the IOPS, policies of the pattern, and the like. The information may further include image information as the one illustrated in FIG. 6A, which indicates how the configuration of the server 100 looks when the pattern is applied to the server 100.

When a notification to the effect that the notified pattern is to be applied is received from the user, the management server 101 generates the parameter 143 that is used to apply the pattern to the server 100, and stores the generated parameter 143 in the LU 140. This enables the device driver 142 to apply an optimum pattern to the server 100 when the server 100 starts running.

While an optimum pattern is determined by the management server 101 here, the configuration of the management server 101 may be included in the server 100. For example, the configuration of the management server 101 may be implemented with the use of a dedicated processor configured to control the server 100 and with the use of a memory.

As described above, according to this invention, a pattern suitable for a user's environment can be determined automatically from among a plurality of patterns in which various factors that cause a drop in IO performance are considered.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a nonvolatile memory card, and a ROM.

The program codes that realize the functions written in the present embodiment can be implemented by a wide range of programming and scripting languages such as assembler, C/C++, Perl, shell scripts, PHP, and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer, comprising:
a plurality of processors each including a plurality of computation cores;
a plurality of memories; and
at least one IO device;
wherein the computer including a plurality of nodes each made up of at least one of the plurality of processors and at least one of the plurality of memories that is accessed from the at least one of the plurality of processors in a shortest access time,
wherein the computer is configured to hold pattern management information, which is used to manage a plurality of patterns defining settings to be set to the plurality of nodes in order to carry out data transfer between the computer and an apparatus coupled to the computer via the at least one IO device,
wherein the computer comprises a control module configured to determine a pattern to be applied to the computer based on IO performance in each of the plurality of patterns,
wherein the pattern management information includes policy information for each of the plurality of patterns, the policy information including a policy on placement of a transfer-use memory area, which is used for the data transfer, in the plurality of nodes, a policy on placement of driver management information, which is used to operate the at least one IO device, in the plurality of nodes, and a policy on allocation of computation cores that execute processing of the data transfer in the plurality of nodes, and
wherein the control module is configured to:
apply each of the plurality of patterns to the computer based on the pattern management information, to thereby measure IO performance in each of the plurality of patterns; and
determine, based on a result of analyzing the IO performance, one of the plurality of patterns that is highest in IO performance as a pattern to be applied to the computer.

2. The computer according to claim 1,
wherein the at least one IO device includes an IO count counting module configured to count a number of times IO access for each a block size, the IO access is executed between at least one of the plurality of processors and the at least one IO device, and
wherein the control module is configured to:
measure IO performance in each of the plurality of patterns for each the block size;
obtain from the IO count counting module the IO access count of each the block size;
identify a frequently used block size, which is a block size having the highest IO access count, based on the IO access count of each the block size; and
refer to a result of measuring the IO performance to determine, as a pattern to be applied to the computer, one of the plurality of patterns that is highest in IO performance at the frequently used block size.

3. The computer according to claim 2,
wherein the computer is coupled to a storage apparatus storing an operating system and a device driver, and
wherein the control module is configured to:
generate a parameter to be used by the device driver to apply the determined one of the plurality of patterns to the computer; and
store the parameter in the storage apparatus.

4. The computer according to claim 2, wherein the pattern management information includes policy information of a first pattern being used to set, as computation cores that execute the data transfer, the plurality of computation cores included in each of the plurality of nodes, being used to place the driver management information in the memory included in each of the plurality of nodes, and being used to place the transfer-use memory area in the memory included in one of the plurality of nodes that requires a smallest number of hops to access the at least one IO device.

5. The computer according to claim 2, wherein the pattern management information includes policy information of a second pattern being used to set, as computation cores that execute the data transfer, the plurality of computation cores included in each of the plurality of nodes, being used to place the driver management information in the memory included in each of the plurality of nodes, and being used to place the transfer-use memory area in the memory included in each of the plurality of nodes.

6. The computer according to claim 2, wherein the pattern management information includes policy information of a third pattern being used to set, as computation cores that execute the data transfer, the plurality of computation cores included in one of the plurality of nodes that requires a smallest number of hops to access the at least one IO device, being used to place the driver management information in the memory included in one of the plurality of nodes that requires the smallest number of hops to access the at least one IO device, and being used to place the transfer-use memory area in the memory included in one of the plurality of nodes that requires the smallest number of hops to access the at least one IO device.

7. The computer according to claim 2, wherein the pattern management information includes policy information of a fourth pattern being used to set, as computation cores that execute the data transfer, the plurality of computation cores included in each of the plurality of nodes, being used to place the driver management information in the memory included in one of the plurality of nodes that requires a smallest number of hops to access the at least one IO device, and being used to place the transfer-use memory area in the memory included in one of the plurality of nodes that requires the smallest number of hops to access the at least one IO device.

8. An optimization method for a computer,
the computer having:
a plurality of processors each including a plurality of computation cores;
a plurality of memories; and
at least one IO device;
the computer including a plurality of nodes each made up of at least one of the plurality of processors and at least one of the plurality of memories that is accessed from the at least one of the plurality of processors in a shortest access time,
the computer being configured to hold pattern management information, which is used to manage a plurality of patterns defining settings to be set to the plurality of nodes in order to carry out data transfer between the computer and an apparatus coupled to the computer via the at least one IO device,
the computer including a control module configured to determine a pattern to be applied to the computer based on IO performance in each of the plurality of patterns,
the pattern management information including policy information for each of the plurality of patterns, the policy information including a policy on placement of a transfer-use memory area, which is used for the data transfer, in the plurality of nodes, a policy on placement of driver management information, which is used to operate the at least one IO device, in the plurality of nodes, and a policy on allocation of computation cores that execute processing of the data transfer in the plurality of nodes, and
the optimization method including:
a first step of applying, by the control module, each of the plurality of patterns to the computer based on the pattern management information, to thereby measure IO performance in each of the plurality of patterns and analyzing the IO performance; and
a second step of determining, by the control module, based on a result of the analyzing the IO performance, one of the plurality of patterns that is highest in IO performance as a pattern to be applied to the computer.

9. The optimization method according to claim 8,
wherein the at least one IO device includes an IO count counting module configured to count a number of times IO access for each a block size, the IO access is executed between at least one of the plurality of processors and the at least one IO device, and
wherein the first step includes a step of:
measuring, by the control module, IO performance in each of the plurality of patterns for each the block size;
obtaining, by the control module, from the IO count counting module the IO access count that is counted with the block size as the unit of taking the count; and
identifying, by the control module, a frequently used block size, which is a block size having the highest IO access count, based on the IO access count of each the block size, and wherein the second step includes a step of referring to a result of measuring the IO performance to determine, as a pattern to be applied to the computer, one of the plurality of patterns that is highest in IO performance at the frequently used block size.

10. The optimization method according to claim 9,
wherein the computer is coupled to a storage apparatus storing an operating system and a device driver, and
wherein the optimization method further includes a step of:
generating, by the control module, a parameter to be used by the device driver to apply the determined one of the plurality of patterns to the computer; and
storing, by the control module, the parameter in the storage apparatus.

11. The optimization method according to claim 9, wherein the pattern management information includes policy information of a first pattern being used to set, as computation cores that execute the data transfer, the plurality of computation cores included in each of the plurality of nodes, being used to place the driver management information in the memory included in each of the plurality of nodes, and being used to place the transfer-use memory area in the memory included in one of the plurality of nodes that requires a smallest number of hops to access the at least one IO device.

12. The optimization method according to claim 9, wherein the pattern management information includes policy information of a second pattern being used to set, as computation cores that execute the data transfer, the plurality of computation cores included in each of the plurality of nodes, being used to place the driver management information in the memory included in each of the plurality of nodes, and being used to place the transfer-use memory area in the memory included in each of the plurality of nodes.

13. The optimization method according to claim 9, wherein the pattern management information includes policy information of a third pattern being used to set, as computation cores that execute the data transfer, the plurality of computation cores included in one of the plurality of nodes that requires a smallest number of hops to access the at least one IO device, being used to place the driver management information in the memory included in one of the plurality of nodes that requires the smallest number of hops to access the at least one IO device, and being used to place the transfer-use memory area in the memory included in one of the plurality of nodes that requires the smallest number of hops to access the at least one IO device.

14. The optimization method according to claim 9, wherein the pattern management information includes policy information of a fourth pattern being used to set, as computation cores that execute the data transfer, the plurality of computation cores included in each of the plurality of nodes, being used to place the driver management information in the memory included in one of the plurality of nodes that requires a smallest number of hops to access the at least one IO device, and being used to place the transfer-use memory area in the memory included in one of the plurality of nodes that requires the smallest number of hops to access the at least one IO device.

* * * * *